(12) United States Patent
Yamanaka (10) Patent No.: US 11,049,316 B2
(45) Date of Patent: Jun. 29, 2021

(54) SYNTHETIC IMAGE GENERATION APPARATUS, SYNTHETIC IMAGE GENERATION PROGRAM, AND SYNTHETIC IMAGE GENERATION METHOD

(71) Applicant: OFFICE YAMANAKA Consolidated Company, Asakita-ku (JP)

(72) Inventor: Takumi Yamanaka, Asakita-ku (JP)

(73) Assignee: OFFICE YAMANAKA Consolidated Company, Hiroshima (JP)

(*) Notice: Subject to any disclaimer, the term of this patent is extended or adjusted under 35 U.S.C. 154(b) by 0 days.

(21) Appl. No.: 16/999,928

(22) Filed: Aug. 21, 2020

(65) Prior Publication Data

US 2021/0065443 A1 Mar. 4, 2021

(30) Foreign Application Priority Data

Aug. 29, 2019 (JP) .............................. JP2019-156343

(51) Int. Cl.
*G06T 17/05* (2011.01)
*G06T 17/20* (2006.01)

(52) U.S. Cl.
CPC .............. *G06T 17/05* (2013.01); *G06T 17/20* (2013.01)

(58) Field of Classification Search
CPC ......... G06T 17/05; G06T 17/20; G06T 15/04; G06T 15/80
See application file for complete search history.

(56) References Cited

U.S. PATENT DOCUMENTS 8,744,126 B1 * 6/2014 Rohrschneider ..... G06K 9/0063
382/103

2013/0131978 A1 * 5/2013 Han ........................ G06T 15/20
701/436

FOREIGN PATENT DOCUMENTS

| JP | 2007048185 A | 2/2007 |
|---|---|---|
| JP | 2011048495 A | 3/2011 |
| JP | 2018005846 A | 1/2018 |

OTHER PUBLICATIONS

Office Action dated Oct. 24, 2019 for Japanese Application 2019-156343.
Shoichiro Uchiyama, "Utilization of SfM-MVS technology for acquiring three-dimensional shape in natural disaster research," High-Definition Topography Symposium collection of papers—All of the topographical information~, Mar. 31, 2015, pp. 20-23.

* cited by examiner

*Primary Examiner* — Said Broome (57) ABSTRACT

A synthetic image generation apparatus has a digital surface model (DSM) generator, a slope map generator, a curvature map generator and a synthetic image generator. The digital surface model (DSM) generator meshes three-dimensional point group data and generates a DSM including height of a building and vegetation. The slope map generator calculates a slope amount in accordance with the DSM and generates a slope map expressing levels of the slope amounts with shading in two colors. The curvature map generator smooths the DSM, calculates curvature in accordance with the smoothed DSM, and generates a curvature map expressing bumps and dips according to the curvature with shading in two colors. The synthetic image generator generates a synthetic image obtained by superimposing the slope map transmitted at first transmittance, the curvature map transmitted at second transmittance, and an orthochromatic image.

3 Claims, 10 Drawing Sheets

SYNTHETIC IMAGE GENERATION APPARATUS, SYNTHETIC IMAGE GENERATION PROGRAM, AND SYNTHETIC IMAGE GENERATION METHOD

CROSS REFERENCE TO RELATED APPLICATIONS

This application claims priority from Japanese Patent Application No. 2019-156343 filed Aug. 29, 2019. The entire content of the priority application is incorporated herein by reference.

TECHNICAL FIELD

This disclosure relates to a synthetic image generation apparatus and techniques relevant thereto.

BACKGROUND

There have been conventionally proposed techniques relevant to a relief map that expresses landforms stereoscopically.

Specifically, there has been disclosed a technique of generating a slope degree display image by calculating slope of image data with reference to digital elevation model (DEM) data, and generating a color elevation and slope angle map obtained through transmission synthesis of a slope degree display image having a brightness-controlled gray scale and a color elevation image. The color elevation and slope angle map indicates slope degrees by means of a gray scale, and elevation difference by means of coloring.

There has also been proposed a different technique of calculating three parameters including slope, above-ground opening, and underground opening in accordance with the DEM data, and generating a false color image showing a difference image between the above-ground opening and the underground opening in a gray channel, and the slope in a red channel. The false color image expresses ridges and summits in whitish colors, valleys and depressions in blackish colors, and a steeper slope in a more reddish color.

Figure 1:
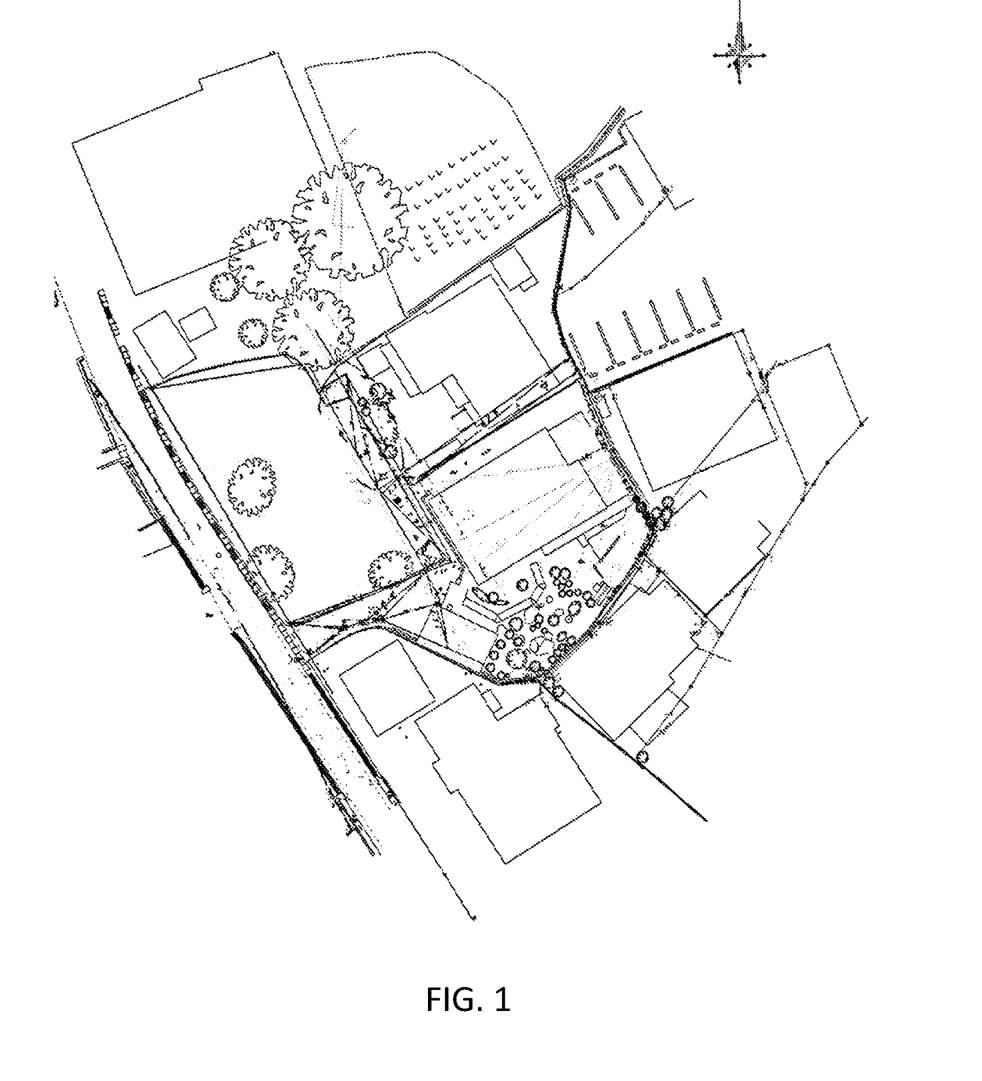
FIG. 1 is a conventional current survey plan view (including boundary points, boundary lines, lengths, and the like)

Recent rapid spread of an unmanned aerial vehicle (UAV) technology or a drone technology has achieved generation of an orthochromatic image (orthographic projection image) having high accuracy with errors of several centimeters, and high resolution such as above-ground resolution of about one centimeter, according to an aerial photograph obtained through UAV surveying. This has enabled using such an orthochromatic image in a map or a figure in a larger scale than conventional ones. As shown in FIG. 1, in a UAV surveyed region, a view generated through conventional above-ground surveying (surveyed planimetric features expressed in a plan view) is replaced with a current survey plan view (including boundary lines) expressing landforms and planimetric features located in a portion obtained by tracing the orthochromatic image in black or gray, and expressing boundaries and other information obtained by an existing survey in different colors.

The orthochromatic image having high accuracy and high resolution is not regarded as being sufficiently utilized if the orthochromatic image is simply used for tracing landforms and planimetric features.

Figure 2:
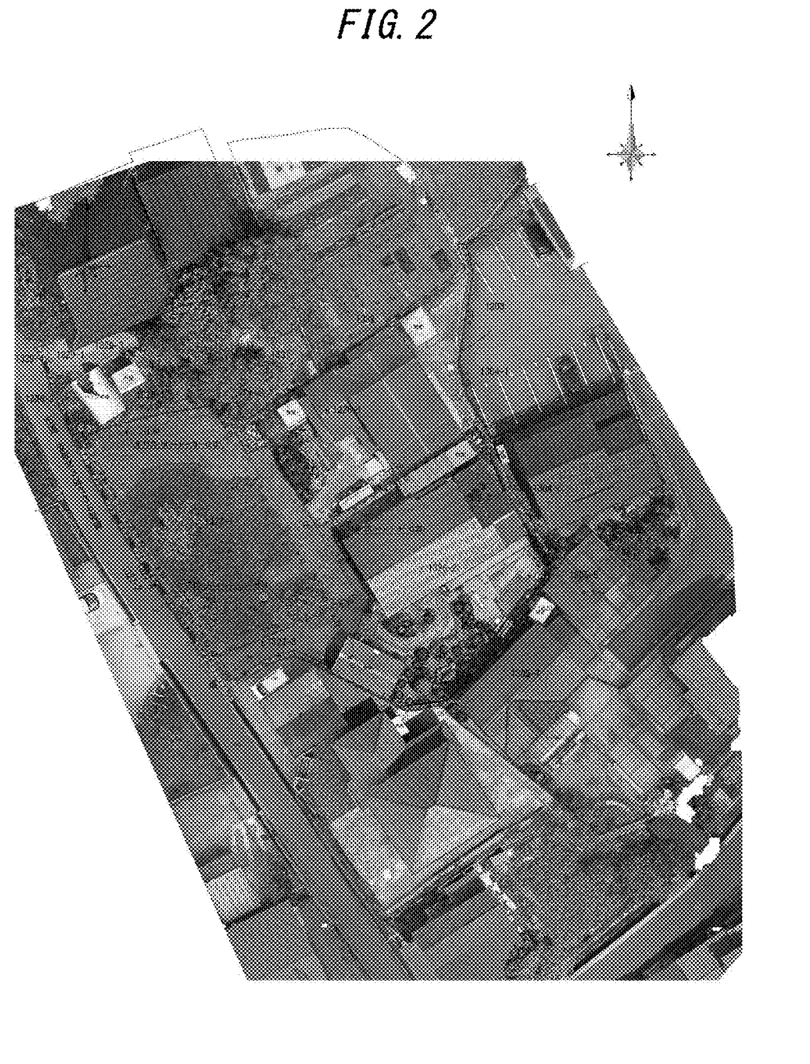
FIG. 2 is a superimposed view obtained by superimposing the current survey plan view on an orthochromatic image.

As shown in FIG. 2, the inventors of the present application have devised display by superimposing a current survey plan view on an orthochromatic image having high accuracy, in other words, utilization of the orthochromatic image as a background image of the current survey plan view.

Figure 3:
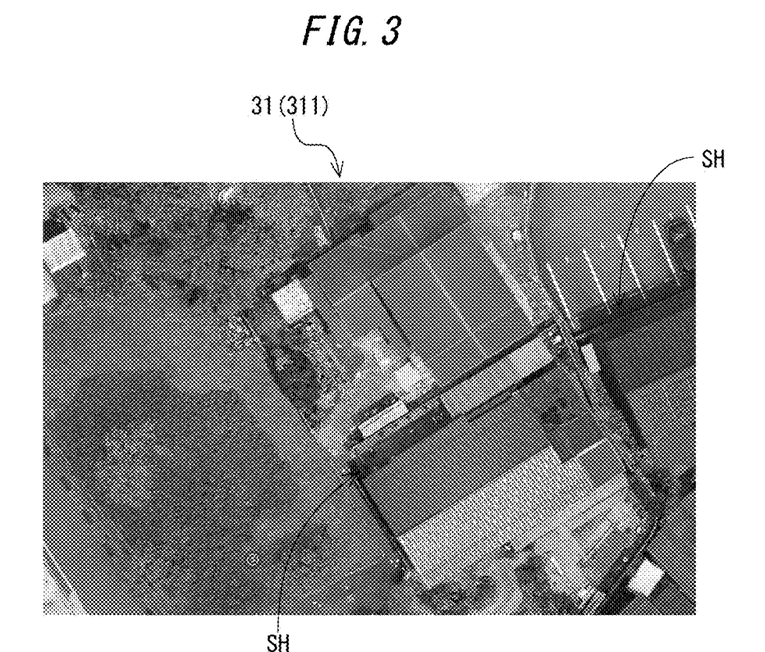
FIG. 3 is a view indicating shadows (black crushing portions) appearing in the orthochromatic image.
Figure 4:
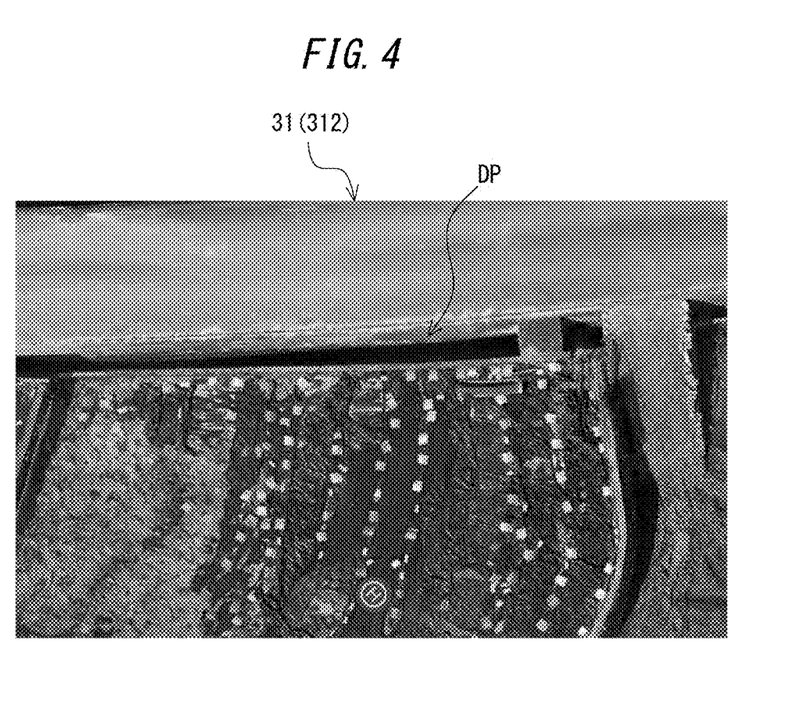
FIG. 4 is a view showing a depression in the orthochromatic image.

As shown in FIG. 3, an aerial photograph obtained through UAV surveying (specifically, an orthochromatic image 31 (311) obtained by orthographic conversion) includes shadows (black crushing portions) SH depending on conditions including photographing time and weather. As shown in FIG. 4, when the orthochromatic image 31 (312) includes a depression DP, planimetric features located in the depression are almost invisible. The orthochromatic image 31 (311, 312) will be less likely to have a black crushing portion if a survey is conducted under a cloudy condition causing fewer shadows. However, such a survey takes longer time to raise another problem.

A current survey plan view ordinarily expresses boundary lines, boundary names, and the like in red and lengths and the like in black. If such a current survey plan view (including points, lines, sections, letters, and the like) is simply superimposed on an orthochromatic image, details of the current survey plan view may have quite poor visibility to be hardly readable depending on texture and color in a superimposed portion.

Figure 5:
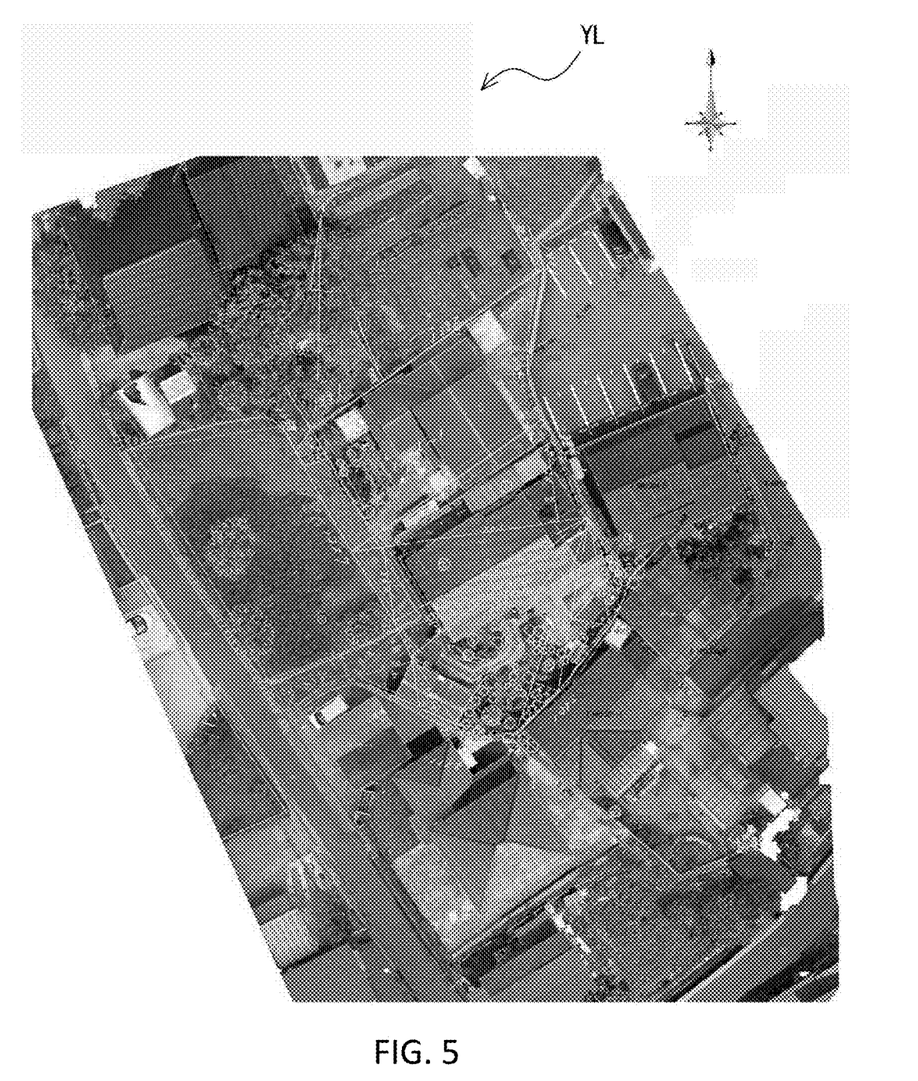
FIG. 5 is a superimposed view obtained by superimposing a current survey plan view expressing planimetric features in yellow on the orthochromatic image.

A current survey plan view including lines, letters, and the like expressed in yellow having relatively high visibility may alternatively be superimposed on the orthochromatic image. However, planimetric features expressed in yellow have significantly low visibility in a range not including the orthochromatic image (a portion having a white background). FIG. 5 actually includes a yellow line in a portion indicated by reference sign YL, which is completely invisible. In particular, the view printed on paper has less visibility than the view displayed on a screen. There are many routinized color selections such as boundary lines ordinarily expressed in red, and it is impractical to change colors in the current survey plan view.

SUMMARY OF THE INVENTION

In view of the above, it is an object of the present invention to provide a synthetic image generation apparatus and techniques relevant thereto that enable generation of a synthetic image more stereoscopic with higher visibility so as to be more appropriate as a background image in comparison to a conventional orthochromatic image.

According to one aspect, this specification discloses a synthetic image generation apparatus. The synthetic image generation apparatus includes a digital surface model (DSM) generator, a slope map generator, a curvature map generator and a synthetic image generator. The digital surface model (DSM) generator meshes three-dimensional point group data and generates a DSM including height of a building and vegetation. The slope map generator calculates a slope amount in accordance with the DSM and generates a slope map expressing levels of the slope amounts with shading in two colors. The curvature map generator smooths the DSM, calculates curvature in accordance with the smoothed DSM, and generates a curvature map expressing bumps and dips according to the curvature with shading in two colors. The synthetic image generator generates a synthetic image obtained by superimposing the slope map transmitted at first transmittance, the curvature map transmitted at second transmittance, and an orthochromatic image.

According to another aspect, this specification also discloses a synthetic image generation program. The synthetic image generation program includes the steps of: (a) meshing three-dimensional point group data and generating a DSM including height of a building and vegetation; (b) calculating a slope amount in accordance with the DSM and generating a slope map expressing levels of the slope amounts with shading in two colors; (c) smoothing the DSM, calculating curvature in accordance with the smoothed DSM, and generating a curvature map expressing bumps and dips according to the curvature with shading in two colors; and (d) generating a synthetic image obtained by superimposing the slope map transmitted at first transmittance, the curvature map transmitted at second transmittance, and an orthochromatic image.

According to another aspect, this specification also discloses a synthetic image generation method. The synthetic image generation method includes the steps of: (a) meshing three-dimensional point group data and generating a DSM including height of a building and vegetation; (b) calculating a slope amount in accordance with the DSM and generating a slope map expressing levels of the slope amounts with shading in two colors; (c) smoothing the DSM, calculating curvature in accordance with the smoothed DSM, and generating a curvature map expressing bumps and dips according to the curvature with shading in two colors; and (d) generating a synthetic image obtained by superimposing the slope map transmitted at first transmittance, the curvature map transmitted at second transmittance, and an orthochromatic image.

According to the present invention, planimetric features located in a region unclearly expressed in an orthochromatic image are restored stereoscopically in a synthetic image. The synthetic image has high compatibility with a current survey plan view. Even when being superimposed on the synthetic image, the current survey plan view (particularly, boundary points, boundary lines, boundary lengths, lot numbers and names, owners, and the like) is not deteriorated in visibility. The synthetic image thus generated is more stereoscopic with higher visibility so as to be more appropriate as a background image in comparison to a conventional orthochromatic image.

BRIEF DESCRIPTION OF THE DRAWINGS

Embodiments in accordance with this disclosure will be described in detail with reference to the following figures wherein.

DETAILED DESCRIPTION OF PREFERRED EMBODIMENTS

1. Embodiment

Description is made, with reference to the drawings, to a synthetic image generation apparatus, a synthetic image generation program, and a synthetic image generation method according to an embodiment of the present invention.

A synthetic image generation apparatus 1 is configured to generate a synthetic image obtained by complementing an orthochromatic image with a stereoscopic effect. The synthetic image generation apparatus 1 is embodied by a known server apparatus or a known computer (e.g. a desktop computer, a laptop computer, or a tablet computer).

Figure 6:
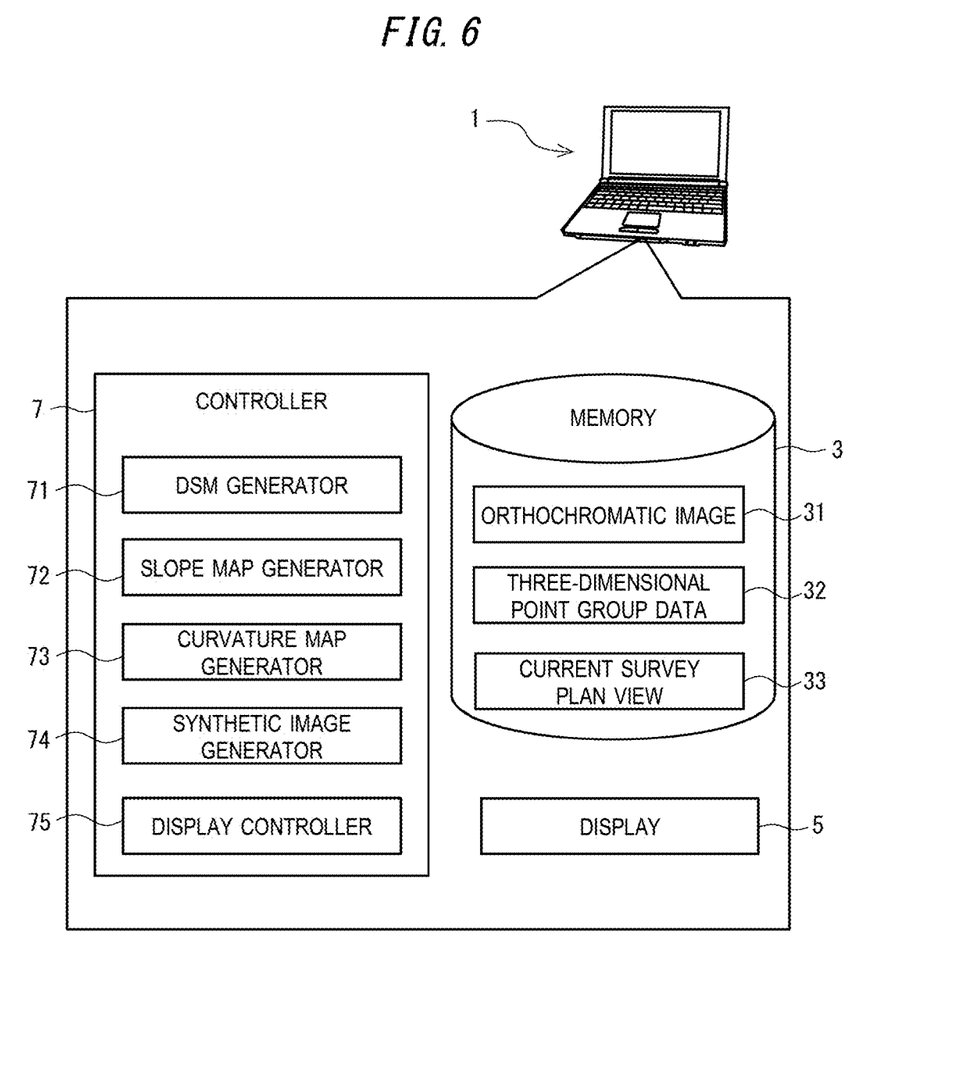
FIG. 6 is a schematic configuration diagram of a synthetic image generation apparatus according to an embodiment of the present invention.

Specifically, as shown in FIG. 6, the synthetic image generation apparatus 1 includes a memory 3, a display 5, and a controller 7.

The memory 3 corresponds to a storage medium such as a hard disk drive (HDD) or a solid state drive (SSD) of a computer, and is configured to store the synthetic image generation program (to be described later) executed by an operating system (OS) or the controller 7. The storage unit 3 further stores an orthochromatic image 31, three-dimensional point group data 32, and a current survey plan view 33.

The orthochromatic image 31 is image data generated from a plurality of aerial photographs captured with use of a UAV. Specifically, the orthochromatic image 31 is generated with use of known Structure from Motion/Multi-View Stereo (SfM/MVS) software. SfM processing includes estimating a photographing position and a photographing direction of a camera in accordance with the plurality of aerial photographs, whereas MVS processing includes restoring a three-dimensional shape in accordance with the photographing position and the photographing direction of the camera.

The three-dimensional point group data 32 is generated with use of known SfM/MVS software, similarly to the orthochromatic image 31, and has coordinate values on an X axis and a Y axis as well as a Z axis (height).

The current survey plan view 33 is image data obtained by surveying planimetric features such as concrete block walls, buildings, and existing landmarks located in an actual place, and substantially reflects dimensions, areas, and heights of a target land.

The display 5 corresponds to a display such as a liquid crystal display panel or an organic EL panel of a computer.

The controller 7 corresponds to a central processing unit (CPU) or a main memory of a computer, and includes a digital surface model (DSM) generator 71, a slope map generator 72, a curvature map generator 73, a synthetic image generator 74, and a display controller 75.

The DSM generator 71 is a processor configured to mesh (raster convert) the three-dimensional point group data 32 and generate a DSM in a raster form as meshed data. The DSM relates to heights of grounds as well as heights of an earth surface including buildings and vegetation, and is also referred to as a numerical value surface model.

The slope map generator 72 is a processor configured to calculate slope amounts of a ground surface in accordance with the DSM in the raster form and generate a slope map (also referred to as slope layers) expressing levels of the slope amounts with shading in black and white.

The curvature map generator 73 is a processor configured to smooth the DSM (meshed data) and generate a curvature map (also referred to as curvature layers) expressing bumps and dips based on curvature calculated in accordance with the smoothed DSM with shading in two colors.

The synthetic image generator 74 is a processor configured to generate a synthetic image obtained by complementing the orthochromatic image 31 with a stereoscopic effect. Specifically, the synthetic image generator 74 is configured to superimpose the slope map, the curvature map, and the orthochromatic image 31 in the mentioned order to generate a synthetic image.

The display controller 75 is a processor configured to control display contents in the display 5.

Figure 7:
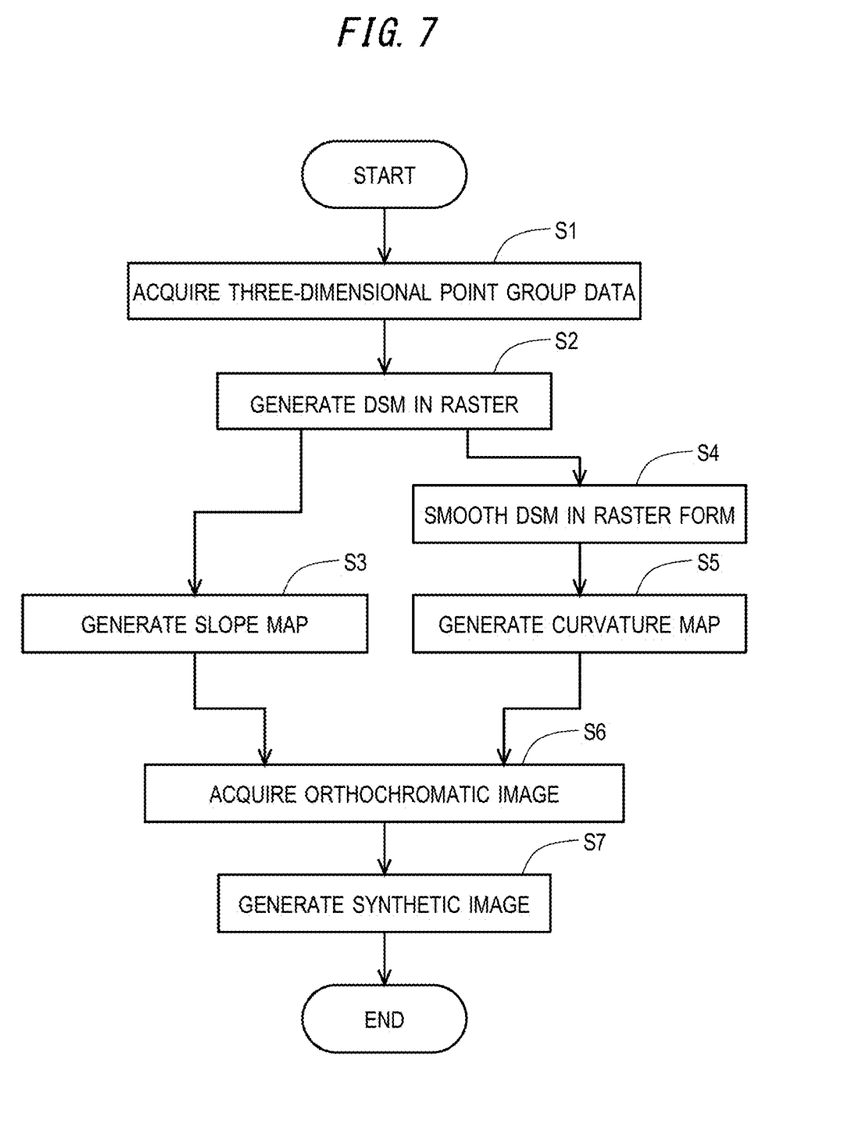
FIG. 7 is a flowchart showing a flow of processing executed by a synthetic image generation program.

Described next with reference to a flowchart in FIG. 7 is a flow of processing in a case of executing the synthetic image generation program.

Initially in step S1, the DSM generator 71 acquires the three-dimensional point group data 32 from the memory 3.

In step S2, the DSM generator 71 converts the three-dimensional point group data 32 to data in the raster form and generates a DSM in the raster form as meshed data (in detail, meshed data having meshes of 0.02 meter (meshes of about twice above-ground resolution assumed as 1 centimeter in the orthochromatic image)). The three-dimensional point group data 32 before being raster converted has high density and large data volume. Therefore, it takes an enormous amount of time to process the three-dimensional point group data 32 as it is. The three-dimensional point group data 32 is thus meshed for reduction in volume in the present embodiment.

Meshing initially includes generating appropriate meshes in the three-dimensional point group data 32. In a case where a target mesh includes a plurality of points, height of the target mesh is assumed as an average value of height coordinates of the plurality of points. In another case where the target mesh includes no point, the height of the target mesh is obtained through interpolation according to the triangulated irregular network (TIN), the inverse distance weighting (IDW), or the like.

Figure 8:
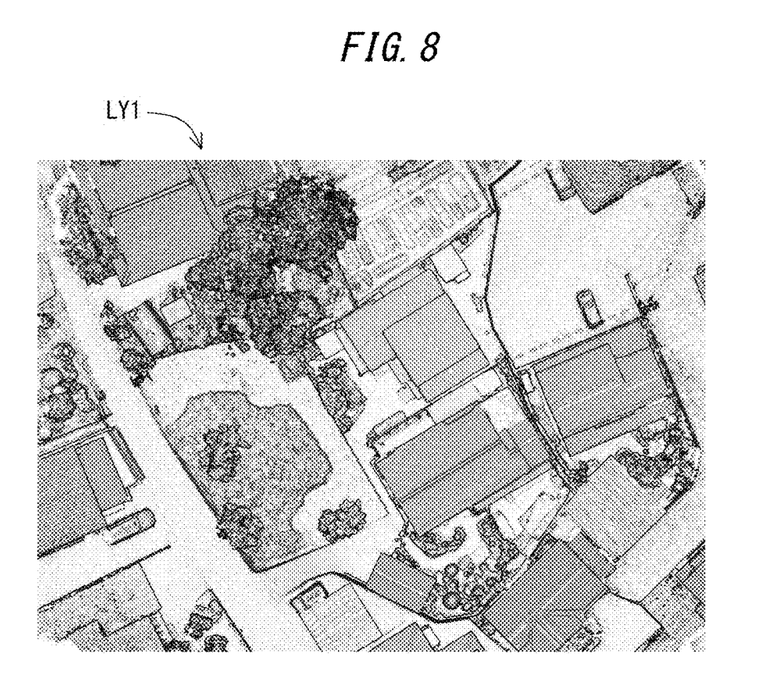
FIG. 8 is a slope map expressing levels of slope amounts with shading in two colors.

In step S3, the slope map generator 72 generates a slope map LY1 shown in FIG. 8 in accordance with the DSM in the raster form generated in step S2.

Specifically, the slope map generator 72 calculates a slope amount of each mesh in accordance with the "Terrain Analysis-Morphometry" as a standard module of the known GIS software "System for Automated Geoscientific Analyses (SAGA)".

The slope map generator 72 subsequently generates a slope map expressing with shading in black and white such that a portion having a smaller slope amount (a less steeper portion) has a more whitish color and a portion having a larger slope amount (a steeper portion) has a more blackish color. The slope map generator 72 eventually transmits the slope map at the transmittance of 50%.

Meanwhile, a curvature map LY2 is generated in step S4 and step S5. Initially in step S4, the controller 7 smooths the DSM in the raster form in accordance with the "Gaussian filter" as a standard module of the known GIS software "System for Automated Geoscientific Analyses (SAGA)". Curvature calculated with reference to the DSM in the raster form being unprocessed leads to too detailed bumps and dips, which make it difficult to seize landforms.

Figure 9:
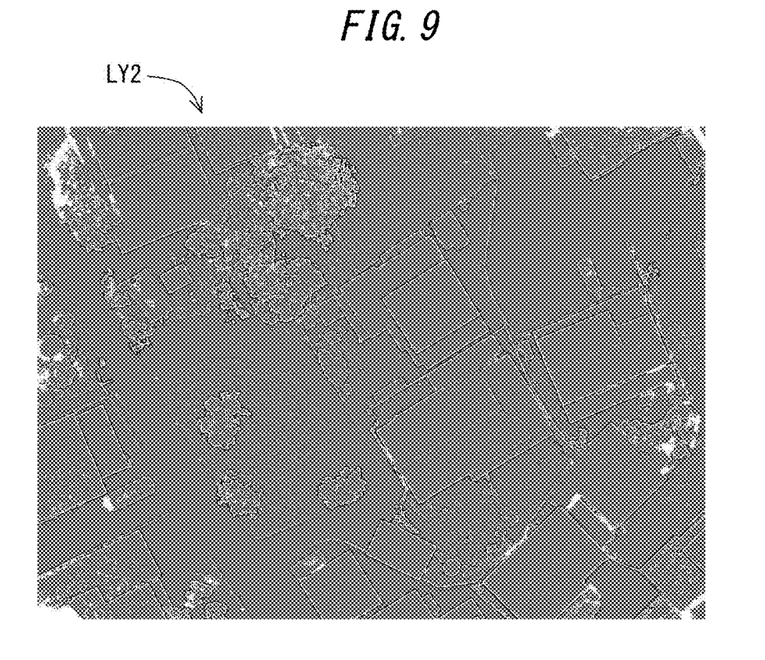
FIG. 9 is a curvature map expressing bumps and dips according to curvature with shading in two colors.

In step S5, the curvature map generator 73 generates the curvature map LY2 shown in FIG. 9 in accordance with the DSM in the raster form generated in step S2.

Specifically, the curvature map generator 73 calculates curvature of each mesh with reference to the smoothed DSM in accordance with the "Terrain Analysis-Morphometry" as a standard module of the "System for Automated Geoscientific Analyses (SAGA)". The curvature thus calculated will have a positive value for a projecting surface, a negative value for a recessed surface, and zero for a graded slope.

The curvature map generator 73 subsequently generates a curvature map expressing with shading in black and white such that a more projecting surface (having a larger absolute value of positive curvature) has a more whitish color and a more recessed surface (having a larger absolute value of negative curvature) has a more blackish color. The curvature map generator 73 eventually transmits the curvature map at the transmittance of 50%.

In step S6, the synthetic image generator 74 acquires the orthochromatic image 31 (see FIG. 3) from the memory 3.

Figure 10:
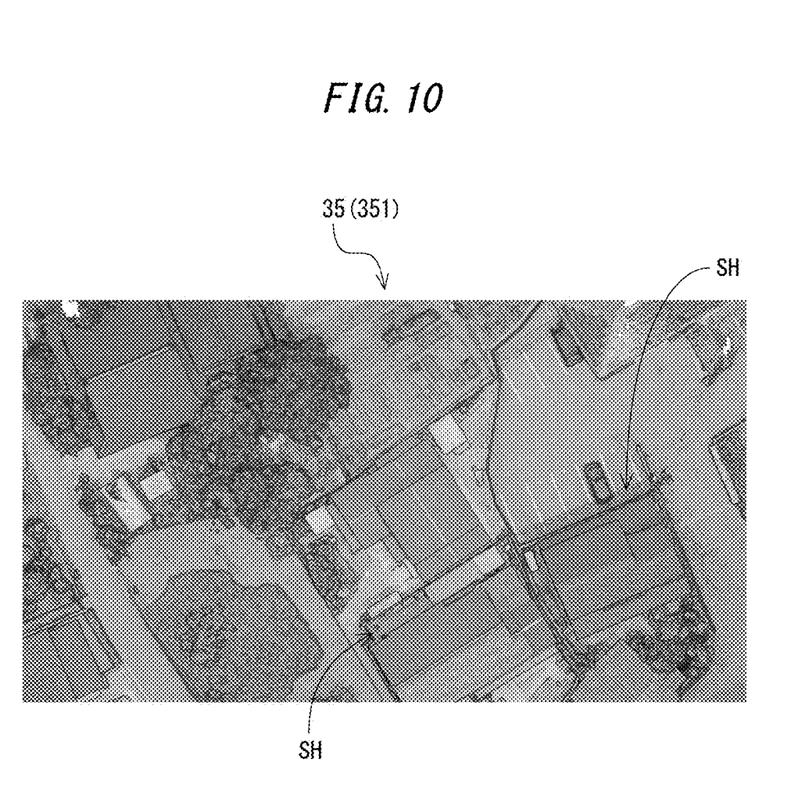
FIG. 10 is a view of a synthetic image obtained by superimposing the slope map, the curvature map, and the orthochromatic image.

In step S7, the synthetic image generator 74 superimposes the slope map LY1 (see FIG. 8), the curvature map LY2 (see FIG. 9), and the orthochromatic image 31 (see FIG. 3) in the mentioned order to generate a synthetic image 35 (see FIG. 10).

The processing described above is executed to generate the synthetic image 35 obtained by complementing the orthochromatic image 31 with a stereoscopic effect.

Upon receipt of a user command to display the synthetic image 35, the display controller 75 causes the display 5 to display the synthetic image 35 generated in accordance with the synthetic image generation program.

Figure 11:
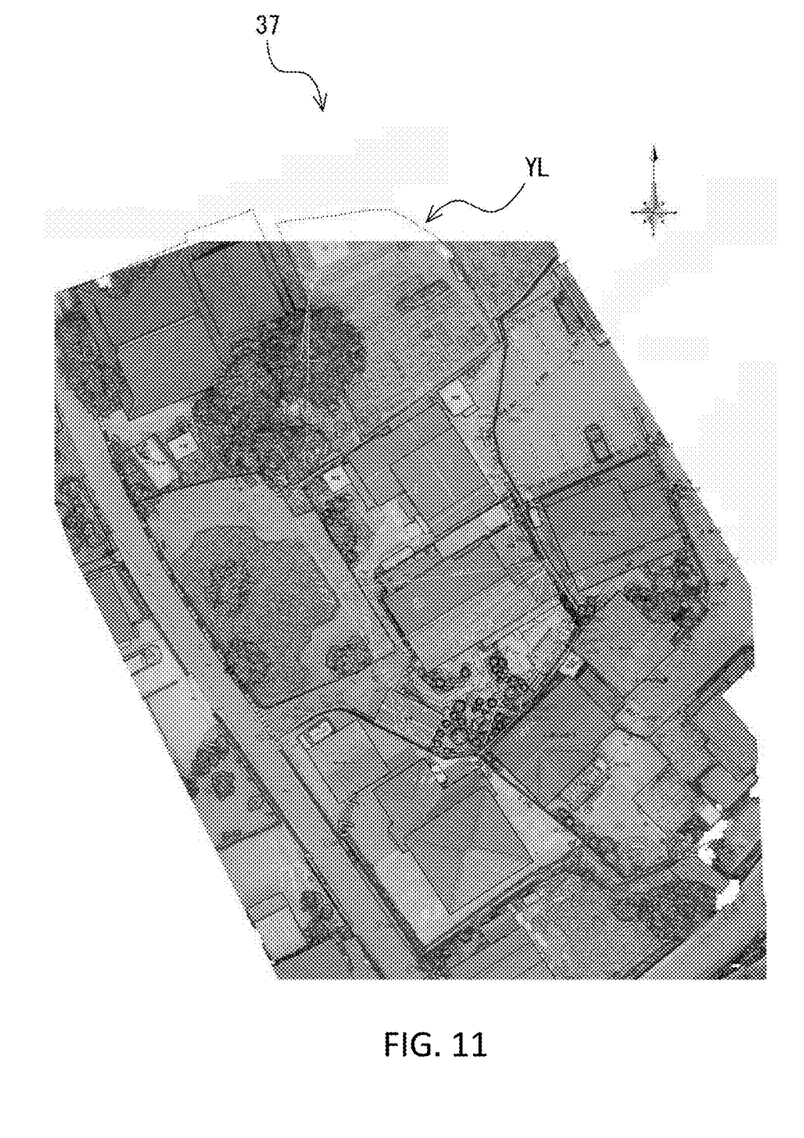
FIG. 11 is a view of a superimposed image obtained by superimposing the current survey plan view on the synthetic image.

Upon receipt of a user command to display the current survey plan view, the display controller 75 causes the display 5 to display a superimposed image 37 obtained by superimposing the current survey plan view 33 on the synthetic image 35 as shown in FIG. 11.

Figure 12:
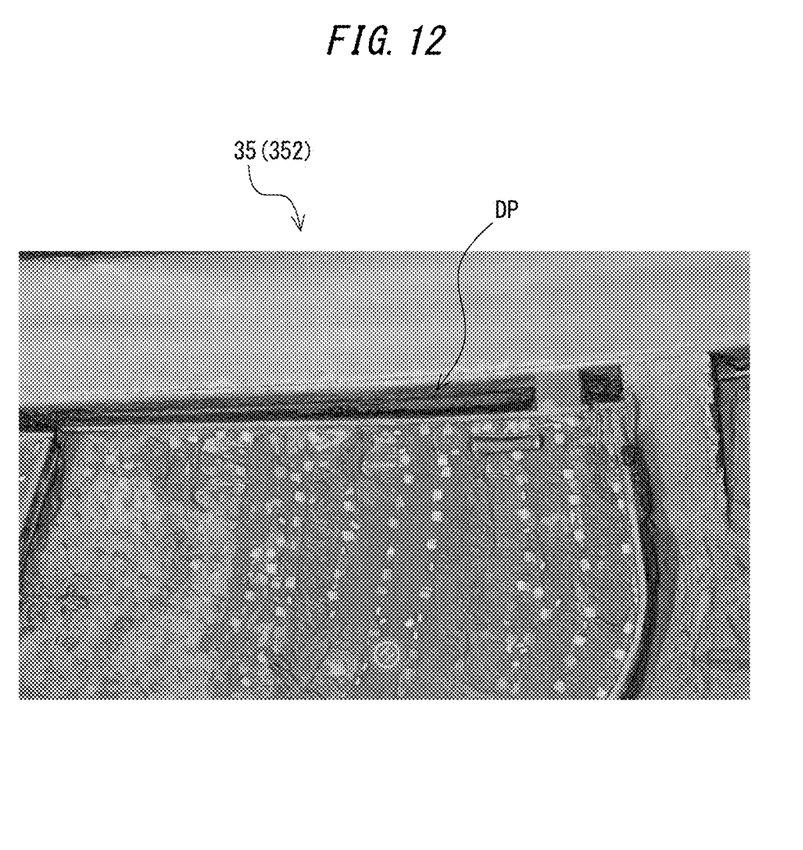
FIG. 12 is a view showing a depression in the synthetic image.

According to the embodiment described above, the orthochromatic image is complemented with a stereoscopic effect by superimposing the orthochromatic image on a landform view (the slope map and the curvature map), so that planimetric features located in a shadow (a black crushing portion) are expressed stereoscopically in the orthochromatic image. Specifically, planimetric features, which are located in regions (the shadows (black crushing portions) SH) unclearly expressed in the orthochromatic image 31 (311) shown in FIG. 3, are restored stereoscopically in the synthetic image 35 (351) shown in FIG. 10. Similarly, planimetric features, which are located in a region (the depression DP) unclearly expressed in the orthochromatic image 31 (312) shown in FIG. 4, are restored stereoscopically in the synthetic image 35 (352) shown in FIG. 12. The synthetic image 35 (351, 352) thus has higher visibility than the conventional orthochromatic image 31 (311, 312).

The synthetic image 35 according to the present embodiment particularly has high compatibility with the current survey plan view. As shown in FIG. 11, the current survey plan view 33 (particularly, boundary points, boundary lines, boundary lengths, lot numbers and names, owners, and the like) is never deteriorated in visibility in the superimposed image 37 obtained by superimposing the current survey plan view 33 on the synthetic image 35. The synthetic image 35 thus generated is more stereoscopic with higher visibility so as to be more appropriate as a background image in comparison to the conventional orthochromatic image 31. Furthermore, all or most of existing planimetric features need not be traced depending on surveyed site conditions, which leads to significant improvement in working efficiency.

According to the above embodiment, the orthochromatic image 31 is superimposed on the slope map and the curvature map both of which are transmitted at the transmittance of 50%. The present embodiment particularly adopts "ordinary" as a superimposition method, a combination color of an upper layer (the orthochromatic image) is simply superimposed on a basic color of lower layers (the slope map and the curvature map both of which are transmitted at the transmittance of 50%). The colors of the orthochromatic image 31 are thus entirely suppressed, and the generated synthetic image 35 has whitish colors (i.e. as if tracing paper is overlaid) for further improvement in visibility.

Unlike a cubical drawing method according to Patent Literature 1 or 2, the orthochromatic image 31 itself is complemented with a stereoscopic effect in the above embodiment, so as to be naturally viewed by a user accustomed to conventional aerial photographs.

The synthetic image 35 according to the above embodiment is generated from aerial photographs in a large scale obtained through UAV surveying. The above embodiment thus provides the synthetic image 35 in a larger scale than conventional online maps.

2. Modification Examples

The synthetic image generation apparatus, the synthetic image generation program, and the synthetic image generation method according to the present invention are not limited to those according to the above embodiment, and can be modified or improved in various manners within the scope recited in the claims.

The above embodiment exemplifies generating the orthochromatic image 31 and the three-dimensional point group data 32 with use of products of photographic surveying. The present invention is, however, not limited to this case, and the orthochromatic image 31 and the three-dimensional point group data 32 may alternatively be generated with use of products of aerial laser surveying.

The above embodiment exemplifies generating the synthetic image 35 by superimposing the slope map LY1, the curvature map LY2, and the orthochromatic image 31 in the mentioned order. The present invention is, however, not limited to this case. The synthetic image 35 may alternatively be generated by superimposing the orthochromatic image 31 on the slope map LY1 without using the curvature map LY2. Although being slightly deteriorated in visibility than the synthetic image 35 obtained by using the curvature map LY2, as in the above embodiment, the synthetic image generated without using the curvature map LY2 can be obtained by complementing the orthochromatic image 31 with a stereoscopic effect.

The above embodiment exemplifies expressing both the slope map LY1 and the curvature map LY2 in two colors of black and white. The present invention is, however, not limited to this case. For example, the slope map may be expressed in two colors of red and white, whereas the curvature map may be expressed in two colors of black and white.

The above embodiment exemplifies generating the slope map and the curvature map in accordance with the known GIS software "System for Automated Geoscientific Analyses (SAGA)". The present invention is, however, not limited to this case. There have been proposed various methods of generating a slope layer and a curvature layer with reference to the DSM in the raster form. The slope map and the curvature map may alternatively be generated in accordance with any one of these methods. For example, the slope map may be generated in accordance with the method described in Patent Literature 1, whereas the curvature map may be generated in accordance with the method described in Patent Literature 2.

The above embodiment exemplifies transmitting the slope map and the curvature map at the transmittance of 50%. The present invention is, however, not limited to this case, and each of the slope map and the curvature map may alternatively be transmitted at a transmittance different from 50% within a range from 30% to 70%. The slope map and the curvature map may not necessarily be transmitted at an identical transmittance, but may alternatively be transmitted at transmittances different from each other.

The above embodiment exemplifies storing the orthochromatic image 31, the three-dimensional point group data 32, and the current survey plan view 33 in the memory 3 of the synthetic image generation apparatus 1. The present invention is, however, not limited to this case. The orthochromatic image 31, the three-dimensional point group data 32, and the current survey plan view 33 may alternatively be stored in an external server or an external database that is accessible to the synthetic image generation apparatus 1.

What is claimed is:

1. A non-transitory computer-readable storage medium storing a set of instructions, the set of instructions, when executed by a computer of a synthetic image generation apparatus, cause the synthetic image generation apparatus to perform steps comprising:
    meshing three-dimensional point group data and generating a digital surface model (DSM) including height of a building and vegetation;
    calculating a slope amount in accordance with the DSM and generating a slope map expressing levels of the slope amounts with shading in two colors;
    smoothing the DSM, calculating curvature in accordance with the smoothed DSM, and generating a curvature map expressing bumps and dips according to the curvature with shading in two colors; and
    generating a synthetic image by superimposing the slope map transmitted at first transmittance, the curvature map transmitted at second transmittance, and an orthochromatic image,
    wherein each of the three-dimensional point group data and the orthochromatic image is generated by estimating a photographing position and a photographing direction of a camera with reference to a plurality of aerial photographs by structure/shape from motion (SfM) processing and restoring a three-dimensional shape in accordance with the photographing position and the photographing direction by multi-view stereo (MVS) processing.

2. The non-transitory computer-readable storage medium of claim 1, the steps further comprising causing a display to display a superimposed image obtained by superimposing the synthetic image and a current survey plan view.

3. A computer-implemented synthetic image generation method comprising:
    meshing three-dimensional point group data and generating a DSM including height of a building and vegetation;
    calculating a slope amount in accordance with the DSM and generating a slope map expressing levels of the slope amounts with shading in two colors;
    smoothing the DSM, calculating curvature in accordance with the smoothed DSM, and generating a curvature map expressing bumps and dips according to the curvature with shading in two colors; and generating a synthetic image obtained by superimposing the slope map transmitted at first transmittance, the curvature map transmitted at second transmittance, and an orthochromatic image, wherein each of the three-dimensional point group data and the orthochromatic image is generated by estimating a photographing position and a photographing direction of a camera with reference to a plurality of aerial photographs by structure/shape from motion (SfM) processing and restoring a three-dimensional shape in accordance with the photographing position and the photographing direction by multi-view stereo (MVS) processing.

* * * * *